United States Patent
Jeong et al.

(10) Patent No.: US 9,693,076 B2
(45) Date of Patent: Jun. 27, 2017

(54) VIDEO ENCODING AND DECODING METHODS BASED ON SCALE AND ANGLE VARIATION INFORMATION, AND VIDEO ENCODING AND DECODING APPARATUSES FOR PERFORMING THE METHODS

(71) Applicants: SAMSUNG ELECTRONICS CO., LTD., Suwon-si (KR); Industry-Academic Cooperation Foundation, Yonsei University, Seoul (KR)

(72) Inventors: Seung-soo Jeong, Seoul (KR); Won-woo Ro, Seoul (KR); Ho-cheon Wey, Seongnam-si (KR); Kyung-ah Kim, Seoul (KR); Deok-ho Kim, Seoul (KR); Min-woo Kim, Seoul (KR); Chan-yul Kim, Bucheon-si (KR)

(73) Assignees: SAMSUNG ELECTRONICS CO., LTD., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 213 days.

(21) Appl. No.: 14/591,417

(22) Filed: Jan. 7, 2015

(65) Prior Publication Data
US 2015/0195565 A1 Jul. 9, 2015

Related U.S. Application Data

(60) Provisional application No. 61/924,437, filed on Jan. 7, 2014.

(30) Foreign Application Priority Data

Oct. 16, 2014 (KR) .......................... 10-2014-0140166

(51) Int. Cl.
*H04N 19/51* (2014.01)
*H04N 19/52* (2014.01)
(Continued)

(52) U.S. Cl.
CPC .......... *H04N 19/567* (2014.11); *H04N 19/51* (2014.11); *H04N 19/52* (2014.11); *H04N 19/537* (2014.11)

(58) Field of Classification Search
None
See application file for complete search history.

(56) References Cited

U.S. PATENT DOCUMENTS 8,462,850 B2 6/2013 Mohan et al.
2005/0201464 A1 9/2005 Lee
(Continued)

FOREIGN PATENT DOCUMENTS

| JP | 2009-147807 A | 7/2009 |
| KR | 10-2004-0028489 A | 4/2004 |
| KR | 10-2005-0092306 A | 9/2005 |

OTHER PUBLICATIONS

Communication from the Korean Intellectual Property Office dated Oct. 21, 2015 in a counterpart Korean application No. 10-2014-0140166.
(Continued)

*Primary Examiner* — Reza Aghevli
(74) *Attorney, Agent, or Firm* — Sughrue Mion, PLLC (57) ABSTRACT

A video encoding and decoding methods and apparatuses for performing the methods thereof are provided. The video encoding method includes: determining a region in a current image having a change in at least one of a scale and an angle with respect to a reference image; generating variation information representing a variation in at least one of the scale and the angle between the region in the current image
(Continued)

and a reference region in the reference image corresponding to the region in the current image; and encoding residual information representing a difference between a predicted sample value from the reference image and a sample value of the current image based on the generated variation information.

20 Claims, 9 Drawing Sheets (51) Int. Cl.
    *H04N 19/537*    (2014.01)
    *H04N 19/567*    (2014.01)

(56) References Cited

U.S. PATENT DOCUMENTS

| | | | | |
|---|---|---|---|---|
| 2007/0064791 | A1* | 3/2007 | Okada | H04N 19/52 375/240.1 |
| 2010/0309377 | A1* | 12/2010 | Schoenblum | G06T 5/002 348/607 |
| 2010/0309991 | A1* | 12/2010 | Schoenblum | H04N 19/51 375/240.29 |
| 2011/0193982 | A1* | 8/2011 | Kook | H04N 5/23293 348/222.1 |
| 2012/0288007 | A1* | 11/2012 | Lee | H04N 19/61 375/240.16 |
| 2013/0177076 | A1* | 7/2013 | Itani | H04N 19/105 375/240.03 |
| 2014/0247876 | A1* | 9/2014 | Moriya | H04N 19/00951 375/240.12 |
| 2014/0362919 | A1* | 12/2014 | Zhou | H04N 19/159 375/240.16 |
| 2016/0142734 | A1 | 5/2016 | Kim et al. | |

OTHER PUBLICATIONS

Communication dated Aug. 9, 2016, issued by the Korean Intellectual Property Office in counterpart Korean application No. 10-2014-0140166.

* cited by examiner

VIDEO ENCODING AND DECODING METHODS BASED ON SCALE AND ANGLE VARIATION INFORMATION, AND VIDEO ENCODING AND DECODING APPARATUSES FOR PERFORMING THE METHODS

CROSS-REFERENCE TO RELATED APPLICATIONS

This application claims priority from U.S. Provisional Application No. 61/924,437, filed on Jan. 7, 2014 in the United States Patent and Trademark Office, and Korean Patent Application No. 10-2014-0140166, filed on Oct. 16, 2014 in the Korean Intellectual Property Office, the disclosures of which are hereby incorporated by reference in their entireties.

BACKGROUND

1. Field

Methods and apparatuses consistent with exemplary embodiments relate to video encoding and decoding methods, and more particularly, to method of encoding and decoding based on scale and angle variation information, and video encoding and decoding apparatuses for performing the methods.

2. Description of Related Art

Inter prediction technology for generating a predicted block of a current image by reference to a previously encoded image with a high temporal correlation has been developed. Therefore, when inter prediction technology is used to encode a current image, unnecessary redundancy may be reduced and thus video compression efficiency may be increased.

According to inter prediction technology in related art, a motion vector representing a position variation of an encoding target block in a current image is used to generate a prediction value of the encoding target block of the current image from a reference image.

SUMMARY

One or more exemplary embodiments provide video encoding and decoding methods for efficiently performing video compression based on scale and angle variation information of an object in an image, and video encoding and decoding apparatuses for performing the methods.

According to an aspect of an exemplary embodiment, there is provided a video encoding method including: determining a region in a current image which has a change in at least one of a scale and an angle with respect to a reference image; generating variation information representing a variation of at least one of the scale and the angle between the region in the current image and a reference region in the reference image corresponding to the region in the current image; and encoding residual information representing a difference between a predicted sample value from the reference image and a sample value of the current image based on the generated variation information.

According to an aspect of another exemplary embodiment, there is provided a video encoding apparatus including an encoder configured to: determine a region in a current image which has a change in at least one of a scale and an angle with respect to a reference image, generate variation information representing a variation of at least one of the scale and the angle between the region in the current image and a reference region in the reference image corresponding to the region in the current image, and encode residual information representing a difference between a predicted sample value from the reference image and a sample value of the current image based on the generated variation information.

According to an aspect of another exemplary embodiment, there is provided a video decoding method including: obtaining encoded information of a current image, variation information, and residual information about the current image from a bitstream; determining a reference region in a reference image based on the obtained encoded information; predicting the current image by using the determined reference region and the obtained variation information; and restoring the current image from the predicted current image utilizing the obtained residual information, wherein the variation information comprises at least one of scale and angle variation information.

According to an aspect of another exemplary embodiment, there is provided a video decoding apparatus including: an obtainer configured to obtain encoded information of a current image, variation information, and residual information about the current image from a bitstream; and a decoder configured to determine a reference region in a reference image based on the obtained encoded information, predict the current image based on the obtained variation information, and restore the current image from the predicted current image utilizing the obtained residual information, wherein the variation information comprises at least one of scale and angle variation information between a region in the current image and the reference region.

Additional aspects will be set forth in part in the description which follows and, in part, will be apparent from the description, or may be learned by practice of exemplary embodiments.

BRIEF DESCRIPTION OF THE DRAWINGS

The and/or other aspects will become more apparent and more readily appreciated from the following description of exemplary embodiments, taken in conjunction with the accompanying drawings in which.

DETAILED DESCRIPTION OF EXEMPLARY EMBODIMENTS

Reference will now be made in detail to exemplary embodiments, examples of which are illustrated in the accompanying drawings, wherein like reference numerals refer to like elements throughout. In this regard, exemplary embodiments may have different forms and should not be construed as being limited to the descriptions set forth herein. Accordingly, exemplary embodiments are merely described below, by referring to the figures, to explain aspects of the present disclosure. As used herein, expressions such as "at least one of," when preceding a list of elements, modify the entire list of elements and do not modify the individual elements of the list.

In various exemplary embodiments described below, "images" may generally refer to not only to still images but also to moving images such as videos.

Hereinafter, video encoding and decoding methods and apparatuses based on scale and angle variation information according to various exemplary embodiments will be described with reference to FIGS. 1 to 10.

As used herein, the singular forms "a," "an" and "the" are intended to include the plural forms as well, unless the context clearly indicates otherwise.

Hereinafter, exemplary embodiments will be described in detail with reference to the accompanying drawings. In the following description, the same reference numerals may denote the same elements or corresponding elements, and redundant descriptions thereof may be omitted for the sake of brevity.

Figure 1:
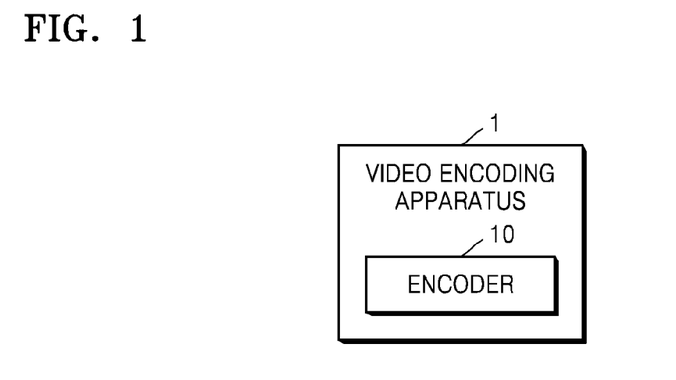
FIG. 1 is a block diagram of a video encoding apparatus according to an exemplary embodiment.

FIG. 1 is a block diagram of a video encoding apparatus according to an exemplary embodiment.

Referring to FIG. 1, the video encoding apparatus 1 may include an encoder 10.

The encoder 10 may determine a region of change in a current image where the change is in at least one of a scale and an angle with respect to a reference image.

The encoder 10 may generate variation information representing a variation of at least one of a scale and an angle between the region of change in the current image and a reference region of the reference image corresponding to the region of change in the current image.

The encoder 10 may predict a sample value of the reference image by using the variation information. The encoder 10 may predict a sample value of the current image by changing the reference region of the reference image based on the variation of at least one of a scale and an angle included in the variation information.

The encoder 10 may encode the current image by using various prediction technologies. When inter prediction technology is used, minimization of a rate-distortion (RD) cost and the reference region of the reference image which corresponds to the region of change in the current image, are determined. The encoder 10 may generate information representing a variation of at least one of a scale and an angle between the region of change and the reference region.

The encoder 10 may encode residue information representing a difference between a predicted sample value and a sample value of the current image.

The encoder 10 may determine whether a size of a current block of the current image is larger than or equal to a predetermined size. When the size of the current block is larger than or equal to the predetermined size, the encoder 10 may determine the region of change in the current block in which there is a change at least one of a scale and an angle from the reference image. That is, the encoder 10 may not determine the region of change in the entire current image including the current block, which has a change in at least one of a scale and an angle from the reference image, but may selectively determine the region of change in the current image having a change in at least one of a scale and an angle from the reference image according to the size of the current block.

For example, the encoder 10 may encode the current image by using various block sizes and then determine the region of change in the current block in which there is a change at least one of a scale and an angle from the reference image when the size of the current block determined to minimize an RD cost is about 16×16 or of a larger size.

On the other hand, when the size of the current block is smaller than a predetermined size, the encoder 10 may perform inter prediction known in related art by using a motion vector representing a block position variation between the current block and a reference block.

For example, the encoder 10 may encode the current image by using various block sizes and then perform inter prediction known in related art by using a motion vector representing a block position variation between the current block and the reference block when the size of the current block determined to minimize an RD cost is smaller than about 16×16.

When determining the region of change in the current image, the encoder 10 may generate a scale space of the current image and analyze the generated scale space. The encoder 10 may determine a change region candidate by analyzing the generated scale space. Herein, in an exemplary embodiment, the change region candidate refers to a pixel or region representing a feature of an object, and refers to a region that may be a candidate for a region that may have a change in at least one of a scale and an angle from the reference image. In general, in an exemplary embodiment, the object may include various regions representing unique features for identification of the object. Herein, the unique features refer to features that do not change regardless of a position change and a view change. A feature point refers to a pixel or region, such as a shape portion, a letter portion, or a corner portion of the object, that does not change regardless of a position change and a view change.

Adjacent images may include the same object, and the size, view (or angle), and position of the object may change; however, the unique features of the object do not change. Thus, when a feature point representing the unique features of the object is determined and information about a variation of the position, scale, and angle of the feature in adjacent images is included, an object state may be predicted similarly to an object state of the current frame by changing the object by the variation of the position, scale, and angle of the feature by using information about the object included in an already encoded frame and only differential information between the predicted object state and the object state of the current frame may be encoded to effectively reduce unnecessary redundancy.

For example, if an adjacent image includes a windmill as an example of the object and a center portion of the windmill is determined as a feature point, variation information representing a variation of the size, position, and angle of the feature between images may be generated. The encoder 10 may predict an adjacent region including the feature point of the current image by changing an adjacent region including the feature point of the reference region by using the variation in the size, position, and angle included in the variation information. The encoder 10 may generate differential information between the predicted region and the region of the current image and encode only the differential information to increase encoding efficiency. For convenience of description, it has been assumed that one object includes one feature point. However, exemplary embodiments are not limited thereto, and one object may include a plurality of feature points. Thus, the size of the encoded differential information may be reduced by accurately predicting the object included in the current image from the reference image based on the variation of the positions, sizes, and angles of features between images.

In this case, a background portion of the current image except for the object may not include a feature point. The encoder 10 may encode the background portion of the current image by predicting the background portion of the current image by using block position variation information. That is, by using a position variation between a block of the background portion of the reference image and a block of the background portion of the current image corresponding to the block of the background portion of the reference image, the encoder 10 may determine a block moved by the position variation from the block of the background portion of the reference image as a predicted block of the current image and encode differential information between the current block and the predicted block.

On the other hand, the background portion of the current image except the object may include a feature point. The encoder 10 may encode the background portion of the current image by using variation information between the feature point of the reference image and the feature point of the current image. The encoder 10 may predict a region adjacent to the feature point of the current image by changing the feature point of the reference image by the variation of the position, size, or angle between the feature points. The encoder 10 may encode differential information between the predicted region and the region adjacent to the feature point of the current image. However, since the variation of the size, position, and angle between objects in the background portion of the image is not significant, the background portion has little change between the images. Thus, when the variation of the size, position, and angle between objects in the background portion of the image is not significant, the current image may be predicted by using the position variation information between the blocks even when the image includes a feature point. That is, the encoder 10 may encode the background portion of the current image by using various prediction technologies and encode the current image by using an optimal prediction method capable of minimizing an RD cost.

The encoder 10 may compare a Hessian determinant value of a predetermined region in the scale space with a Hessian determinant value of a region adjacent to the predetermined region and determine the predetermined region as the change region candidate when the predetermined region has a local maximum value.

The encoder 10 may determine a region interpolated in the predetermined region having the local maximum value as the change region candidate. The encoder 10 may calculate a Haar wavelet response vector of the region of change and a Haar wavelet response vector of a region adjacent to the region of change. Simultaneously, the encoder 10 may calculate a Haar wavelet response vector of the reference region and a Haar wavelet response vector of a region adjacent to the reference region. The encoder 10 may determine a reference direction of the change region and a reference direction of the reference region based on directions of the calculated Haar wavelet response vectors, respectively.

The encoder 10 may generate variation information representing an angle variation based on the determined reference direction of the region of change and the determined reference direction of the reference region. The encoder 10 may generate variation information representing an angle variation between the determined reference direction of the region of change in the current image and the determined reference direction of the reference region in the reference image.

The encoder 10 may set a predetermined region including the region of change based on the determined reference direction of the change region of the current image. The encoder 10 may determine a predetermined region including a reference candidate region based on the determined reference direction of a reference candidate region.

The encoder 10 may calculate a gradient vector of the region of change of the current image. That is, the encoder 10 may calculate a gradient vector of a predetermined region including the region of change of the current image. Also, the encoder 10 may calculate a gradient vector of a reference candidate block. That is, the encoder 10 may calculate a gradient vector of a predetermined region including the reference candidate block.

The encoder 10 may compare the calculated gradient vector of the region of change with the calculated gradient vector of the reference candidate block and determine the reference candidate block as the reference region based on the comparison result.

The encoder 10 may generate variation information representing a scale variation between the region of change and the reference region based on a coordinate value in a scale space representing scale information of the region of change and a coordinate value in a scale space representing scale information of the reference region. That is, the encoder 10 may generate variation information representing the difference between the coordinate value in the scale space of the change region of the current image and the coordinate value in the scale space of the reference region. In this case, the scale variation is a scale variation calculated on the assumption of a uniform scale. However, exemplary embodiments are not limited thereto, and the variation information may be generated based on a change in the object at a non-uniform scale even when the object changes at a non-uniform scale. For example, when an object such as a ball changes momentarily in shape or an object such as a watch rotates, the object such as the ball or the watch may change at a non-uniform scale in an image. In an exemplary embodiment, according to this change, variation information representing this change may be generated.

When encoding the current image by various image prediction technologies and using inter prediction technology, the encoder 10 may determine the reference region of the reference image enabling RD cost minimization and generate information representing a variation between the reference region and an extracted region of the current image to perform inter prediction on the current image. In this case, according to an exemplary embodiment, the variation information refers to information representing at least one of a position variation, a scale variation, and an angle variation of the region of change.

The encoder 10 may encode the residue information representing the difference between the predicted sample value of the reference image based on the variation information and the sample value of the current image.

Figure 2:
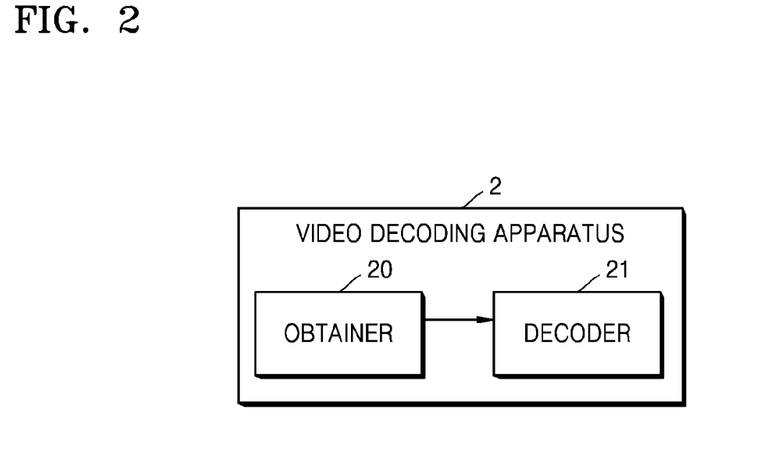
FIG. 2 is a block diagram of a video decoding apparatus according to an exemplary embodiment.

FIG. 2 is a block diagram of a video decoding apparatus according to an exemplary embodiment.

Referring to FIG. 2, the video decoding apparatus 2 may include an obtainer 20 and a decoder 21.

The obtainer 20 may obtain encoded information of a current image, variation information, and residue information about the current image from a bitstream.

The decoder 21 may determine a reference image based on the obtained encoded information. The decoder 21 may determine a reference region of the determined reference image and predict the current image based on the obtained variation information. The obtained variation information may include at least one of scale and angle variation information.

The decoder 21 may restore the current image from the predicted current image based on the obtained residue information. In detail, the decoder 21 may restore the current image by synthesizing the predicted current image and the obtained residue information.

The decoder 21 may determine whether a current block of the current image to be restored has a predetermined size or is larger than the predetermined sized. When the size of the current block is the predetermined size or a is larger than the predetermined size, the decoder 21 may predict the current block based on the variation information including at least one of scale and angle variation information. When the size of the current block is not the predetermined size or of a larger size, the decoder 21 may predict the current block based on motion information including position variation information of the current block.

When determining the reference image, the decoder 21 may generate a scale space of the reference image and determine the reference region by analyzing the generated scale space. The decoder 21 may compare a Hessian determinant value of a predetermined region in the scale space with a Hessian determinant value of a region adjacent to the predetermined region and determine the predetermined region as the reference region when the Hessian determinant value of the predetermined region is a local maximum value. The decoder 21 may determine a region interpolated based on the predetermined region of which the Hessian determinant value is the local maximum value in the scale space as the reference region.

The decoder 21 may calculate a Haar wavelet response vector of a region adjacent to the reference region and determine a reference direction of the reference region based on the direction of the calculated Haar wavelet response vector. The decoder 21 may predict the current image by using the angle variation information based on the determined reference direction of the reference region.

In an exemplary embodiment, the video encoding apparatus 1 and the video decoding apparatus 2 may include a combination of hardware and software. For example, the video encoding apparatus 1 and the video decoding apparatus 2 may each include a hardware processor and a memory. Also, the encoder 10 and the decoder 21 may be software or a combination of software and hardware, in an exemplary embodiment.

Figure 3:
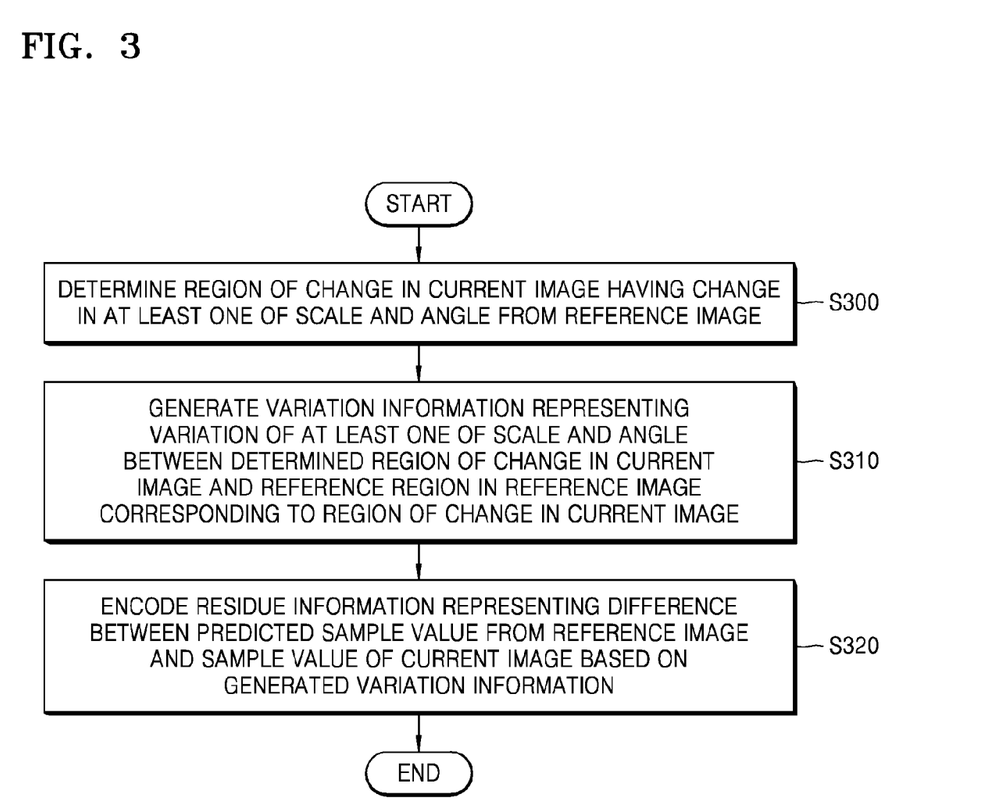
FIG. 3 is a flowchart of a video encoding method based on scale and angle variation information, according to an exemplary embodiment.

FIG. 3 is a flowchart of a video encoding method based on scale and angle variation information according to an exemplary embodiment.

Referring to FIG. 3, in operation S300, the video encoding apparatus 1 may determine a region of change in a current image having a change in at least one of a scale and an angle from or with respect to a reference image.

In operation S310, the video encoding apparatus 1 may generate variation information representing a variation of at least one of a scale and an angle between the determined region of change in the current image and a reference region in the reference image corresponding to the region of change in the current image. Herein, according to an exemplary embodiment, the variation information may be a variation vector representing a scale change or an angle change.

In operation S320, the video encoding apparatus 1 may encode residue information representing a difference between a predicted sample value of the reference image and a sample value of the current image based on the variation information.

Figure 4:
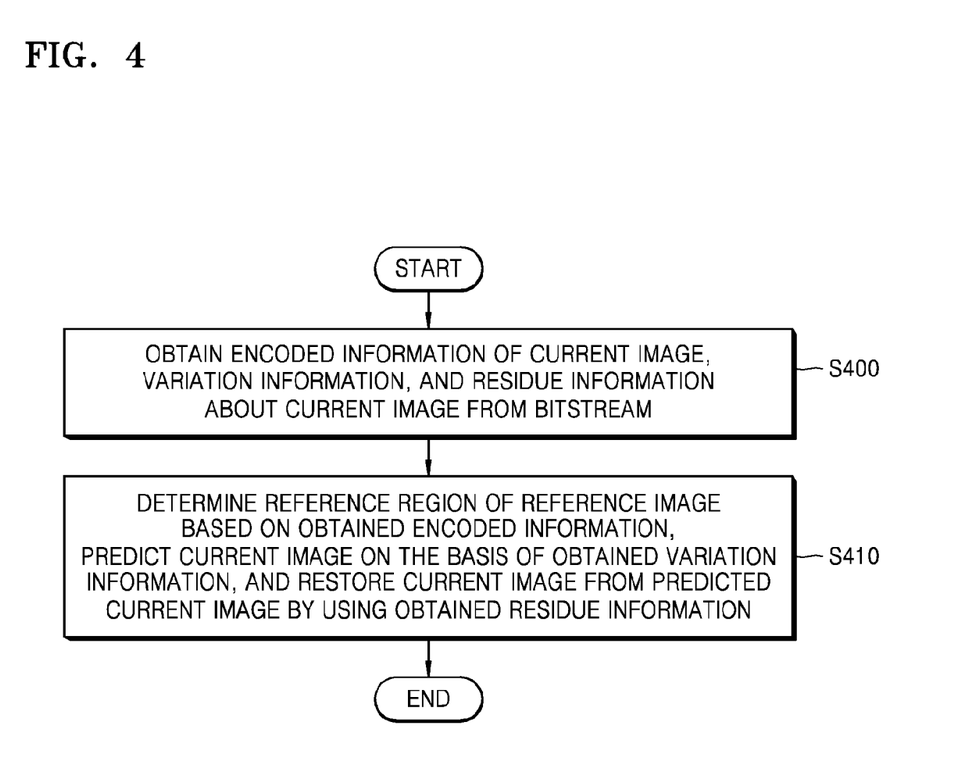
FIG. 4 is a flowchart of a video decoding method based on scale and angle variation information, according to an exemplary embodiment.

FIG. 4 is a flowchart of a video decoding method based on scale and angle variation information according to an exemplary embodiment.

Referring to FIG. 4, in operation S400, the video decoding apparatus 2 may obtain encoded information of a current image, variation information, and residue information about the current image from a bitstream. Herein, the variation information may include scale and angle variation information. In detail, according to an exemplary embodiment, the variation information may include scale and angle variation information between the reference region in the reference image and the region extracted from the current image by the video encoding apparatus 1.

In operation S410, the video decoding apparatus 2 may: determine the reference image based on obtained encoded information, determine the reference region in the determined reference image, predict the current image based on the obtained variation information, and restore the current image from the predicted current image based on the obtained residue information.

Figure 5:
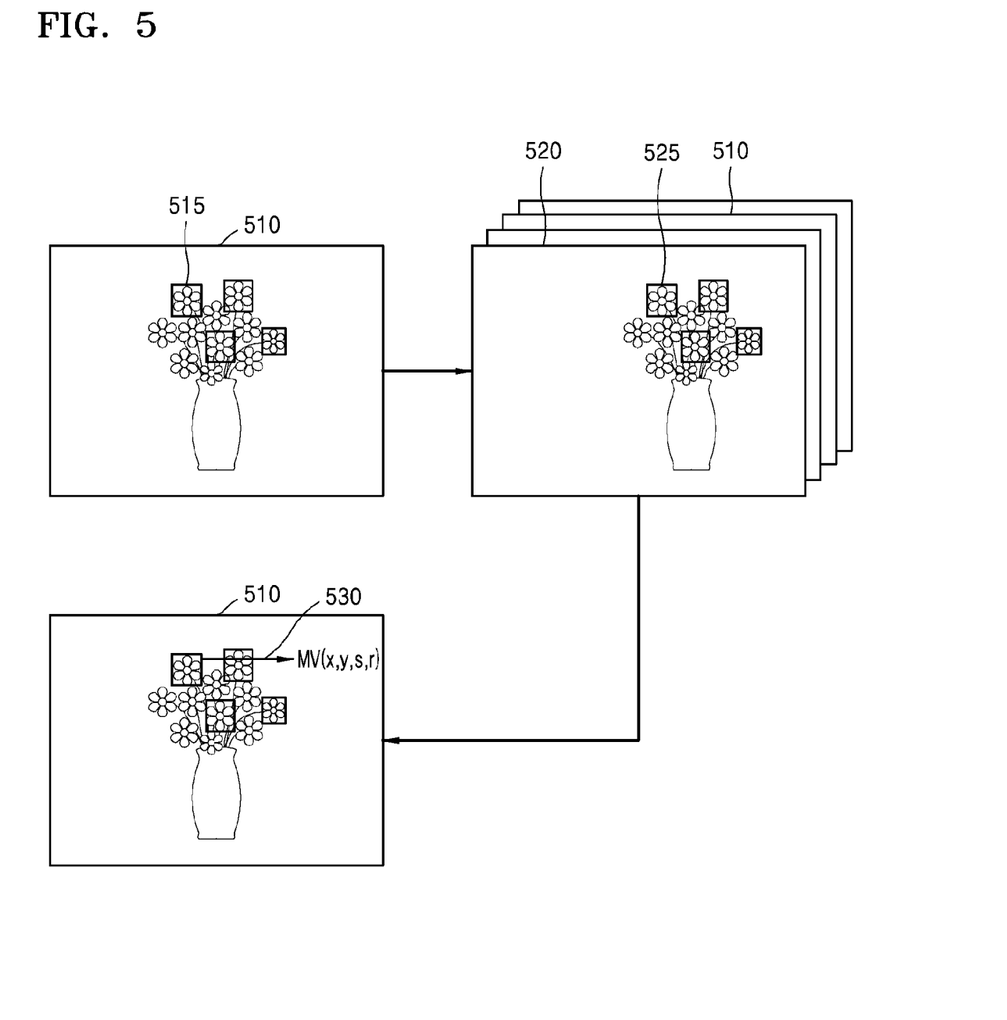
FIG. 5 is a diagram illustrating a process of extracting a feature point from an image, matching the extracted feature point, and determining a variation vector based on the matched feature point, according to an exemplary embodiment.

FIG. 5 is a diagram illustrating a process of extracting a feature point from an image, matching the extracted feature point, and determining a variation vector on the basis of the matched feature point, according to an exemplary embodiment.

Referring to FIG. 5, according to an exemplary embodiment, in the process of encoding a current frame 510, the video encoding apparatus 1 may extract a feature point 515 in the current frame 510. The video encoding apparatus 1 may generate a descriptor including position, scale, and angle information of the extracted feature points such as the feature point 515.

Next, the video encoding apparatus 1 may determine a feature point 525 of a reference frame 520 which matches the feature point 515 based on the descriptor of the feature point 515 extracted from the current frame 510. The video encoding apparatus 1 may define information about the position, scale, and angle variation between the feature point 515 and the feature point 525 which are matched up with each other. That is, the video encoding apparatus 1 may define a variation vector about the position, scale, and angle variation between the feature points.

FIG. 5 illustrates a variation vector 530 about the position, scale, and angle variation between the feature point 515 of the current frame 510 and the feature point 525 of the reference frame 520 which are matched up with each other.

The video encoding apparatus 1 may exclude a motion corresponding to the variation vector 530 from the feature point 525 of the reference frame 520 and generate residue information representing the difference between a predicted sample value of the current image and a sample value of the current image. That is, the video encoding apparatus 1 may predict the current image by using the variation vector 530 from the feature point 525 of the reference frame 520 and generate the residue information representing the difference between the predicted sample value of the current image and the sample value of the current image, according to an exemplary embodiment.

Figure 6A:
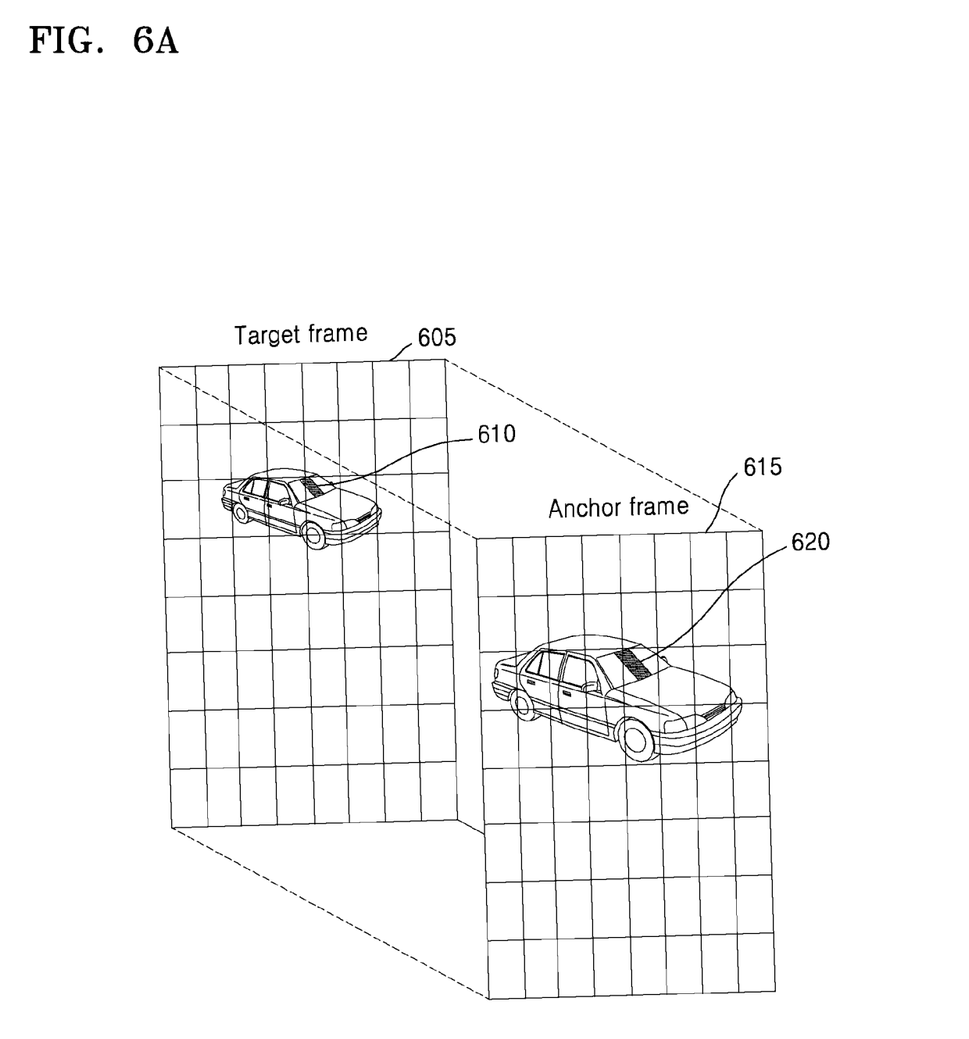
FIGS. 6A and 6B are diagrams illustrating a vector representing a scale and angle variation, according to an exemplary embodiment.
Figure 6B:
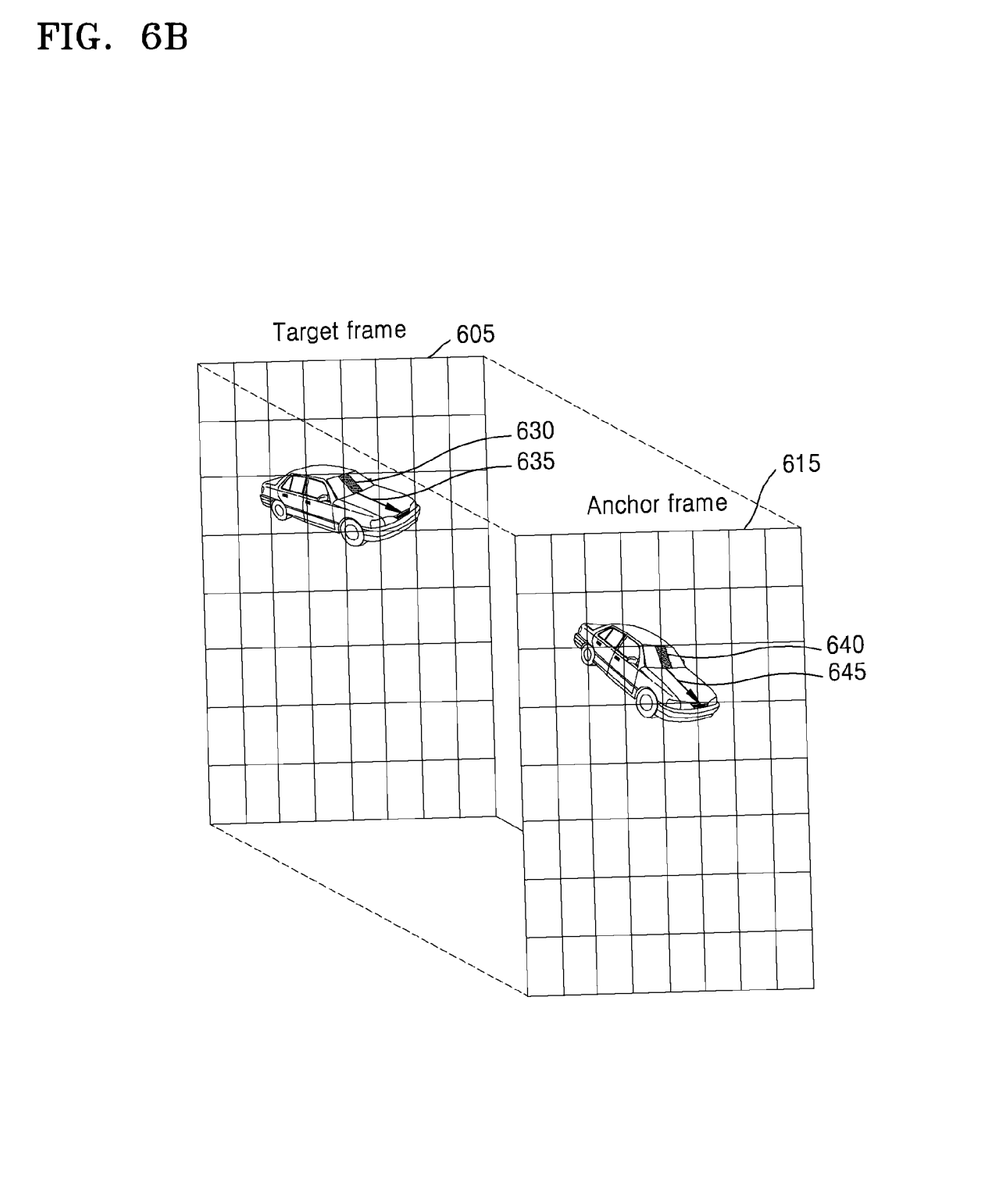

FIGS. 6A and 6B are diagrams illustrating a vector representing a scale and angle variation, according to an exemplary embodiment.

It is assumed that frames illustrated in FIGS. 6A and 6B, according to an exemplary embodiment, include a car, as the object, and have no change in the position of the car while only having a difference in that the car is scaled up or down and/or is rotated.

Referring to FIG. 6A, the video encoding apparatus 1 extracts a feature point 610 from a current frame 605 (target frame), according to an exemplary embodiment. The video encoding apparatus 1 determines a feature point 620 of a reference frame 615 (anchor frame) which matches the feature point 610. The feature point 610 and the feature point 620 have a scale difference therebetween and have no change in their position in the frame and no change in the angle of the object. Thus, a variation vector MV about a scale and angle variation between the feature point 610 and the feature point 620 may be determined by Equation (1) below.

$$MV=(x,y,s+\Delta s,r)-(x,y,s,r) \quad \text{Equation (1)}$$

Since the current frame and the reference frame only have a feature point scale difference therebetween, the scale-up/down of the object may be represented by the variation vector by using scale variation information $\Delta s$. Referring to FIG. 6B, the video encoding apparatus 1 extracts a feature point 630 from the current frame 605 (target frame). The video encoding apparatus 1 determines a feature point 640 of the reference frame 615 (anchor frame) which matches with the feature point 610.

It is assumed that the feature point 630 and the feature point 640 have no change in the position on the frame and no change in the scale of the object. The feature point 630 and the feature point 640 only have an angle change therebetween. That is, by using a vector 635 calculated using the feature point 630 and a vector 645 calculated using the feature point 640, based on a direction change or an angle change between the vector 635 and the vector 645, the video encoding apparatus 1 may determine that there is an angle difference between the feature points while other features are unchanged, according to an exemplary embodiment. A variation vector MV which shows a scale and angle variation between the feature point 630 and the feature point 640 may be determined by Equation (2) below.

$$MV=(x,y,s,r+\Delta r)-(x,y,s,r) \quad \text{Equation (2)}$$

Since the current frame and the reference frame only have a feature point angle difference therebetween, the rotation of the object may be represented by the variation vector by using angle variation information $\Delta r$.

Figure 7:
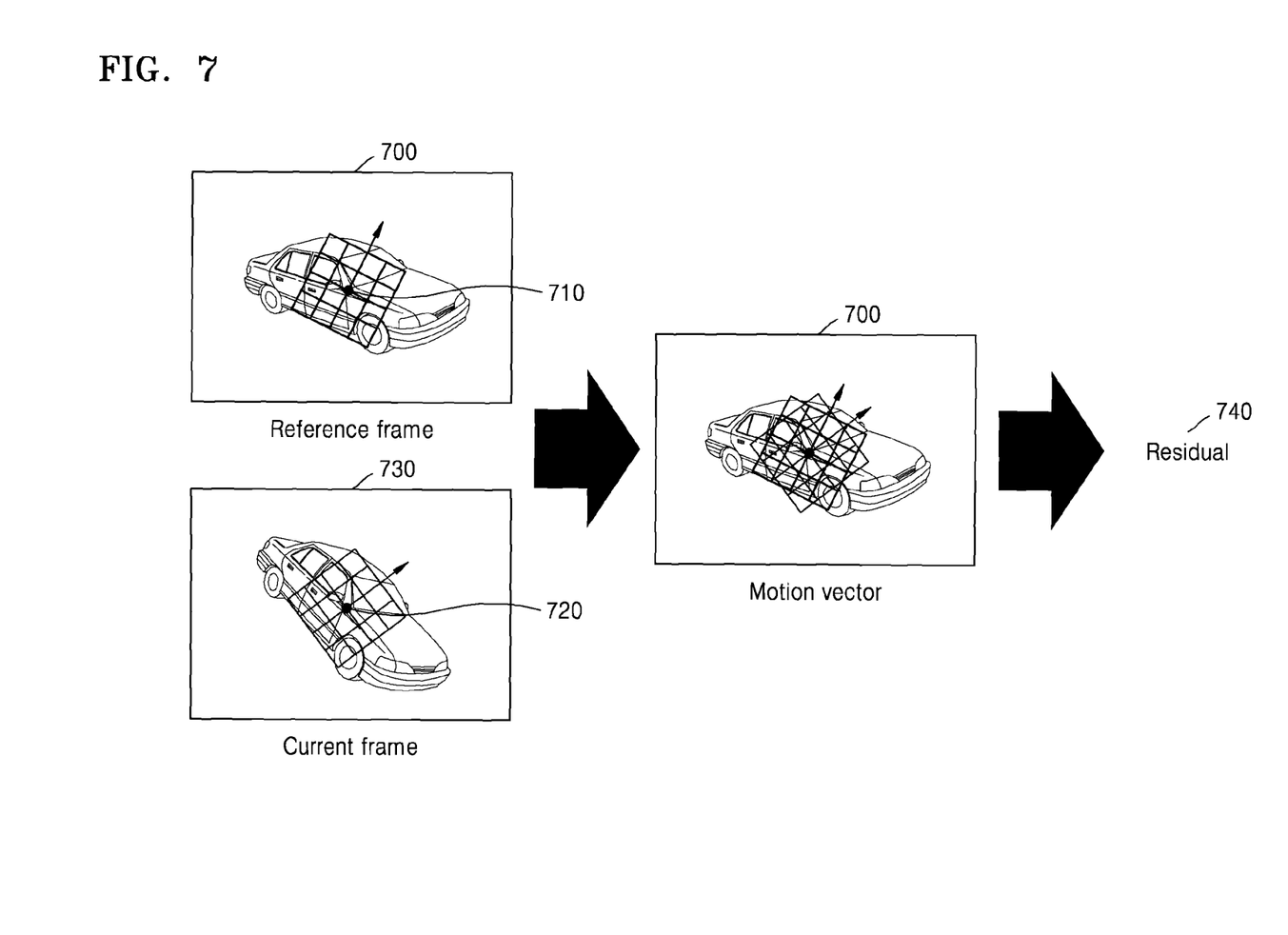
FIG. 7 is a sequence diagram illustrating a process of generating a residual image based on scale and angle variation information, according to an exemplary embodiment.

FIG. 7 is a diagram illustrating a process of generating a residual image based on scale and angle variation information according to an exemplary embodiment.

Referring to FIG. 7, it is assumed that a reference direction vector (illustrated by an arrow in a reference frame 700) is also extracted in relation to a feature point 710, which is extracted from the reference frame 700. The video encoding apparatus 1 may extract a feature point 720 from a current frame 730 and may also extract a reference direction vector (illustrated by an arrow in the current frame 730) in relation to the extracted feature point 720.

The video encoding apparatus 1 determines differences in position, scale, and angle changes between the feature point 720 and the feature point 710. That is, the video encoding apparatus 1 may determine a variation vector representing a position, scale, and angle change between the feature points. Thus, the video encoding apparatus 1 may predict the current frame 730 from the reference frame 700 based on the variation vector representing the position, scale, and angle change.

The video encoding apparatus 1 may generate a residual image 740 representing the difference between a predicted sample value of the current frame and an actual sample value of the current frame.

By using the motion vector representing the position change for inter-frame compression and also using the variation vector about the scale and angle change of the object, as shown in FIG. 7, according to an exemplary embodiment, the video encoding apparatus 1 may predict a realistic motion of the object and thus may minimize the size of the generated residual image.

Figure 8:
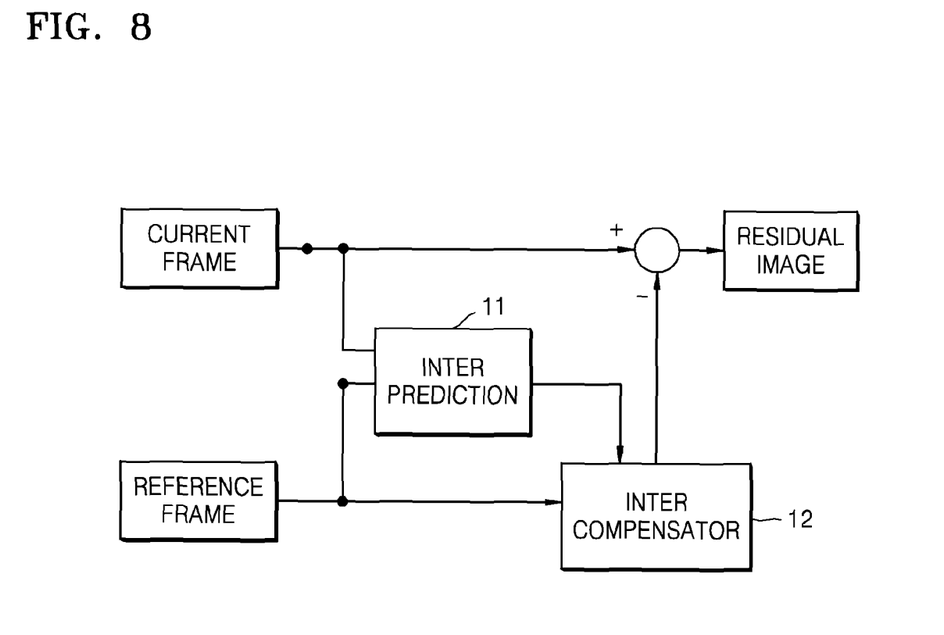
FIG. 8 is a diagram illustrating a process of generating a predicted block of a current image by a video encoding apparatus according to an exemplary embodiment.

FIG. 8 is a diagram illustrating a process of generating a predicted block of a current image by a video encoding apparatus according to an exemplary embodiment.

Referring to FIG. 8, the video encoding apparatus may include an inter predictor 11 and an inter compensator 12.

The inter predictor 11 extracts a feature point of the current frame and a feature point of the reference frame and detects the feature point of the reference frame which is matched with the feature point of the current frame. When the matched feature point is detected, the inter predictor 11 may generate a variation vector representing a scale and angle variation. The inter predictor 11 may perform encoding by various prediction methods, determine the best prediction method among the various prediction methods while considering an RD cost, and determine the variation vector and the feature point of the current frame to be used for prediction according to the determined prediction method.

The inter compensator 12 may generate a value of a predicted block of the current image based on the reference frame and the variation vector generated by the inter predictor 11. The inter compensator 12 generates a predicted sample value of the predicted block of the current image. The video encoding apparatus 1 may generate a residual image representing the difference between the sample value of the current frame and the predicted sample value of the predicted block of the current image.

Referring to FIG. 8, the video encoding apparatus 1 according to another exemplary embodiment may include an inter predictor 11 and an inter compensator 12.

The inter predictor 11 may determine whether a size of a current block divided from the current image is of a predetermined size or is of a size larger than the predetermined size, and predict a sample value of the current block from the reference image based on the scale and angle variation information when the size of the current block is the predetermined size or larger than the predetermined size. When the size of the current block is determined as being smaller than the predetermined size, the inter predictor 11 may predict the sample value of the current block from the reference image based on the variation information only about a block position change.

The video encoding apparatus 1 determines whether to predict the current block, based on the scale and angle variation information according to the size of the divided current block. The reason for this is that when the divided current block is determined as being large, it is determined as a region including the object and thus the current block may be effectively predicted based on the scale and angle variation information of the object. On the other hand, when the size of the divided current block is small, it is mostly a texture region from which a feature point of the object is difficult to extract. Therefore, in an exemplary embodiment, the video compression efficiency is not high even when the current block is predicted and encoded based on the scale and angle variation information of the object. Thus, the video encoding apparatus 1 according to another exemplary embodiment may effectively predict the current block based on the scale and angle variation information of the object only when the block size is large.

Figure 9:
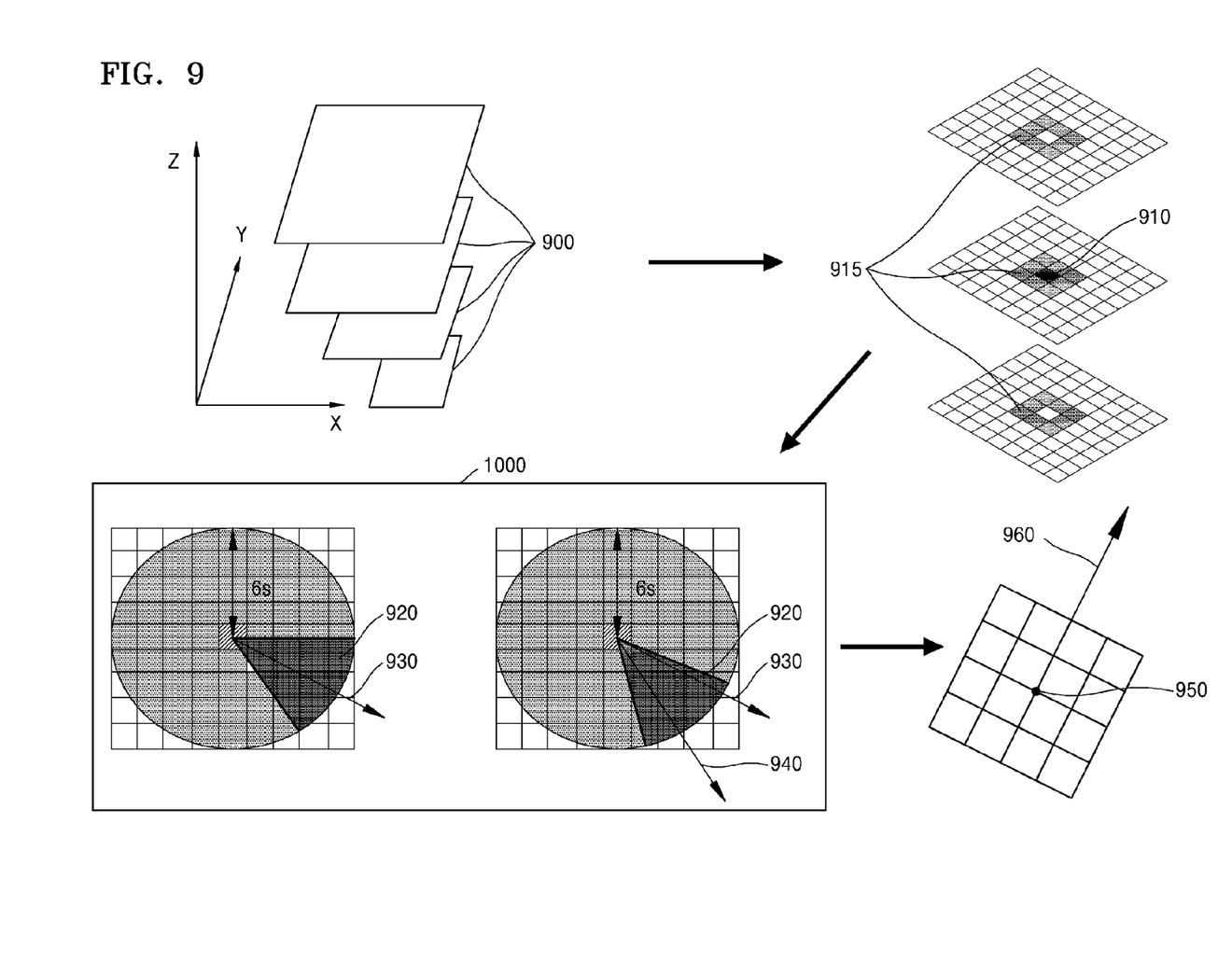
FIG. 9 is a diagram illustrating a process of extracting a feature point and generating a feature descriptor by a video encoding apparatus according to an exemplary embodiment.

FIG. 9 is a diagram illustrating a process of extracting a feature point and generating a feature descriptor by a video encoding apparatus according to an exemplary embodiment.

Referring to FIG. 9, the video encoding apparatus 1 may define the position and size of a feature point by analyzing a scale space 900 of an image. The scale space 900 may be generated by the video encoding apparatus 1 by applying box filters of different sizes to the current image and calculating a Hessian determinant in each pixel. That is, the video encoding apparatus 1 may generate sub-sampled images by applying box filters of different sizes to the current image, and may generate the scale space 900 by stacking the generated sub-sampled images in the shape of a pyramid.

The video encoding apparatus 1 may detect feature points by analyzing the scale space 900. The detected feature points may be matched up with each other regardless of scales of the images. For a three-dimensional (3D) coordinate defined as (x,y,z) in the scale space 900, (x,y) may be defined as a position coordinate of the feature point in the current image, and a z coordinate may be defined as a scale.

FIG. 9 further illustrates a process of extracting a feature point from the scale space 900.

A point at which a Hessian determinant has a local maximum value may be extracted as a feature point from the scale space 900. By comparing Hessian determinant values of pixels represented as a current pixel 910 and a surrounding pixel 915 in a space including three adjacent scale images, when a value of the current pixel 910 is greater than a value of the surrounding pixel 915, it may be a local maximum value and thus the current pixel 910 may be extracted as a feature point, according to an exemplary embodiment.

As illustrated in FIG. 10, the feature points may be extracted by scale space analysis, according to an exemplary embodiment.

Since the position of the feature point extracted in FIG. 9 is the position in a discontinuous scale space and the coordinate of a sub-sampled image existing in the scale space 900, an interpolation operation is performed to detect an accurate scale value and an accurate position of the feature point in the original image.

An interpolation (or localization) process is a process of predicting an accurate position of the feature point by approximately correcting the position of the local maximum value detected in the scale space, and a position of an interest point I is determined by Equation (3) below. The interest point I may refer to an interpolated feature point according to an exemplary embodiment.

A more accurate position of the feature point is determined by the interpolation process according to an exemplary embodiment.

Referring to FIG. 9, the video encoding apparatus 1 may determine a reference direction of the feature point. The video encoding apparatus 1 calculates the sum of all internal Haar wavelet response vector values by using a window 920 having a size of about pi/3 in a circle spaced apart by an about 6-scale radius from the center of the feature point. This is provided by way of an example only and not by way of a limitation. The calculated sum value corresponds to a dominant vector 930 of the window 920. The video encoding apparatus 1 may define the direction of a vector having the greatest value among the dominant vectors generated while moving the window 920, as the reference direction of the feature point.

For example, referring to FIG. 9, the vector 930 may equal to the sum of all Haar wavelet response vector values of the window 920, as illustrated in a the left side of a box 1000. Referring to the right side of the box 1000, when the window 920 moves by about 0.15 radians, since a vector 940 equal to the sum of all Haar wavelet response vector values of the window 920 is greater than the vector 930, the newly obtained vector 940 may be updated in the reference direction of the feature point, according to an exemplary embodiment.

Referring to FIG. 9, the video encoding apparatus 1 may perform an operation of extracting a feature descriptor to represent the feature point in the shape irrelevant to the rotation direction. The feature descriptor defines the characteristics of the feature point. That is, the feature descriptor includes the position, angle, and scale information of the feature point, according to an exemplary embodiment.

For example, the video encoding apparatus 1 divides a square zone having an about 20-scale length perpendicular to a reference direction 960 of a feature point 950 by about 4×4. Thereafter, the video encoding apparatus 1 obtains four types of gradient vectors in each zone by using Equation (4) below, and defines a feature descriptor of the feature point by using the obtained gradient vectors. Herein, each gradient vector may be a descriptor element.

$$[\Sigma D_x | \Sigma D_x | \Sigma D_y | \Sigma D_y |]^T \qquad \text{Equation (4)}$$

In Equation (4), $\Sigma D_x$ and $\Sigma D_y$ may denote the sum of Haar wavelet responses in the x and y axis directions respectively. The video encoding apparatus 1 may generate a feature descriptor having 64 (=4×4×4) descriptor elements by using Equation (3).

The feature including the position, scale, and angle information of each feature point is defined by using the feature descriptor having 64 descriptor elements, and the feature descriptor representing the feature point is the gradient vector of an image block obtained from a square perpendicular to the reference direction of the feature point. Therefore, according to an exemplary embodiment, by comparing the obtained gradient value of each feature point with the gradient value of another feature point regardless of the reference direction thereof, the video encoding apparatus 1 may determine whether the feature points match with each other.

For example, a similarity comparison between the feature descriptors may be made by using Equation (5) below.

$$X = [xi \quad xr \quad xc]^T = -H^{-1}D \qquad \text{Equation (3)}$$

$$I = \begin{bmatrix} \underset{Ipoint \cdot x}{x + xc \times \text{step}} & \underset{Ipoint \cdot y}{y + xr} & \underset{Ipoint \cdot scale}{0.1333 \times (m \cdot \text{filter} + xl \times (m \cdot \text{filter} - b \cdot \text{filter})} & \underset{Ipoint \cdot laplacian}{m \cdot laplacian(x, y)} \end{bmatrix}$$

$$RMSE = \sqrt{\frac{\sum_{i}^{n}(x_{1,i} - x_{2,i})^2}{n}} \quad \text{Equation (5)}$$

In Equation (5), $x_{1,i}$ may denote an ith descriptor element of a feature point 1, and $x_{2,i}$ may denote an ith descriptor element of a feature point 2. "n" may denote the number of descriptor elements. According to an exemplary embodiment, "n" may be about 64. The video encoding apparatus 1 may obtain a root mean square error (RMSE) value by comparing 64 descriptor elements of two feature points by using Equation (5).

The video encoding apparatus 1 according to an exemplary embodiment may calculate RMSE values of the feature points of the reference image with respect to each feature point of the current image, select two feature points having the smallest RMSE value, and select the feature point having the smallest RMSE value as the feature point matched with the feature point of the current image when a ratio $$\left(\frac{\text{min}RMSE}{\text{secondmin}RMSE}:\right)$$

between the selected RMSE values is smaller than a predetermined value.

An object-based variation vector according to an exemplary embodiment may be represented by adding MV(s) and MV(r) to a block-based motion vector that is used in a related-art motion prediction. MV(s) may denote a scale change between the feature points matched in the current frame and the feature points in the reference frame. That is, MV(s) may denote a position difference of the z coordinate in the scale space between the feature points. MV(r) may denote an angle change between the reference direction vectors of the feature points. In detail, MV(r) may denote an angle difference between the reference directions of the feature points. The scale-up/down and rotation information of the object may be represented by using MV(s) and MV(r), and thus the residual image except the scale and angle variation of the feature point of the object and the motion from the reference block in the x,y direction of the block may be generated, according to an exemplary embodiment.

As described above, according to the one or more of the above exemplary embodiments, the real motion of the object may be more accurately predicted from the reference image by using not only the motion vector representing the position variation of the encoding target block of the current image but also the variation vector representing the scale and angle variation of the object included in the image. Accordingly, the size of the residual image may be minimized and thus the video compression efficiency may be increased.

The above terms such as "include" and "have" should be interpreted in default as inclusive or open rather than exclusive or closed unless expressly defined to the contrary.

The exemplary embodiments may be written as a program and may be implemented in a general-purpose digital computer that executes the program by using a computer-readable recording medium. Examples of the computer-readable recording medium include recording media such as magnetic storage media (e.g., ROMs, floppy disks, hard disks, etc.) and optical recording media (e.g., CD-ROMs, DVDs, etc.).

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of an inventive concept as defined by the following claims and their equivalents.

What is claimed is:

1. A video encoding method comprising:
   determining, by at least one processor, a region in a current image which has a change in at least one of a scale and an angle with respect to a reference image;
   generating, by the at least one processor, variation information including at least one of difference component in the scale and difference component in the angle between the region in the current image and a reference region in the reference image corresponding to the region in the current image;
   encoding based on the generated variation information, by the at least one processor, residual information representing a difference between a predicted sample value from the reference image and a sample value of the current image by performing transformation and quantization on the residual information; and
   generating a bitstream including the variation information and the encoded residual information.

2. The video encoding method of claim 1, wherein the determining the region in the current image comprises:
   determining whether a size a current block in the current image is a predetermined size or is larger than the predetermined size; and
   determining the region in the current block in response to the determining that the size of the current block is the predetermined size or is larger than the predetermined size.

3. The video encoding method of claim 1, wherein the determining the region in the current image comprises:
   generating a scale space of the current image; determining a region candidate based on the generated scale space; and
   determining the region in the current image based on the determined region candidate having a change in at least one of a scale and an angle with respect to the reference image.

4. The video encoding method of claim 3, wherein the determining the region candidate comprises:
   comparing a Hessian determinant value of a predetermined region in the scale space with a Hessian determinant value of a region adjacent to the predetermined region; and
   determining the predetermined region as the region candidate when the predetermined region has a local maximum value with respect to a value of a sample in the predetermined region.

5. The video encoding method of claim 4, wherein a region interpolated in the predetermined region having the local maximum value is determined to be the region candidate.

6. The video encoding method of claim 1, wherein the generating the variation information between the region and the reference region comprises:

calculating a Haar wavelet response vector of the region and a Haar wavelet response vector of a region adjacent to the region and a Haar wavelet response vector of a Haar wavelet response vector of the reference region and a Haar wavelet response vector of a region adjacent to the reference region;

determining a reference direction of the region and a reference direction of the reference region based on directions of the calculated Haar wavelet response vectors, respectively; and generating variation information representing an angle variation based on the determined reference direction of the region and the determined reference direction of the reference region.

7. The video encoding method of claim 6, wherein the determining the region in the current image comprises:

setting a predetermined region comprising the region based on the determined reference direction of the region;

determining a predetermined region comprising a first region based on a determined reference direction of the first region;

calculating a gradient vector of a predetermined region of the region and a gradient vector of a predetermined region of the first region; and determining the first region as the reference region based on a comparison result between the calculated gradient vector of the region and the calculated gradient vector of the first region.

8. The video encoding method of claim 1, wherein the generating the variation information comprises generating variation information representing a scale variation between the region in the current image and the reference region based on a coordinate value in a scale space representing scale information of the region in the current image and a coordinate value in a scale space representing scale information of the reference region.

9. A video encoding apparatus comprising an encoder configured to:

determine a region in a current image which has a change in at least one of a scale and an angle with respect to a reference image, generate variation information including at least one of difference component in the scale and difference component in the angle between the region in the current image and a reference region in the reference image corresponding to the region in the current image, encode, based on the generated variation information, residual information representing a difference between a predicted sample value from the reference image and a sample value of the current image by performing transformation and quantization on the residual information, and generate a bitstream including the variation information and the encoded residual information.

10. A video decoding method comprising:

obtaining, by at least one processor, encoded information of a current image, variation information, and residual information about the current image from a bitstream;

determining, by the at least one processor, a reference region in a reference image based on the obtained encoded information;

predicting, by the at least one processor, the current image by using the determined reference region and the obtained variation information; and restoring, by the at least one processor, the current image from the predicted current image by performing inverse-quantization and inverse-transformation on the obtained residual information, wherein the variation information comprises at least one of difference component in scale and difference component in angle between a region in the current image and the reference region in the reference image.

11. The video decoding method of claim 10, wherein the predicting the current image comprises:

determining whether a size of a current block in the current image is of a predetermined size or larger than the predetermined size; and predicting the current image utilizing the variation information in response to the size of the current block being the predetermined size or being larger than the predetermined size.

12. The video decoding method of claim 10, wherein a scale space of the current image is generated, a region candidate is determined by analyzing the generated scale space, a region of the determined region candidate having a change in the scale and the angle with respect to the reference image is determined as a region, and the encoded information comprises information about the reference region in the reference image determined corresponding to the region in the current image.

13. The video decoding method of claim 12, wherein a Hessian determinant value of a predetermined region in the scale space is compared with a Hessian determinant value of a region adjacent to the predetermined region, the predetermined region is determined as the region candidate when the predetermined region has a local maximum value with respect to a value of a sample in the predetermined region, and the encoded information comprises information about the reference region in the reference image determined corresponding to the determined region candidate.

14. The video decoding method of claim 13, wherein a region interpolated in the predetermined region having the local maximum value is determined as the region candidate, and the encoded information comprises information about the reference region in the reference image corresponding to the region candidate.

15. The video decoding method of claim 14, wherein a Haar wavelet response vector of the region in the current image, a Haar wavelet response vector of a region adjacent to the region in the current image, a Haar wavelet response vector of the reference region in the reference image, and a Haar wavelet response vector of a region adjacent to the reference region are calculated, are calculated, a reference direction of the region in the current image and a reference direction of the reference region is determined based on the directions of the calculated Haar wavelet response vectors, respectively, and the variation information comprises variation information representing an angle variation, which is generated based on the determined reference direction of the region in the current image and the determined reference direction of the reference region.

16. The video decoding method of claim 15, wherein a predetermined region comprising the region in the current image is set based on the determined reference direction of the region in the current image, a predetermined region comprising a first region is determined based on a determined reference direction of the first region, a gradient vector of a predetermined region of the region in the current image and a gradient vector of a predetermined region of the first region, are calculated, and the encoded information comprises information about the reference region in the reference image determined as the first region based on a comparison result between the calculated gradient vector of the region in the current image and the calculated gradient vector of the first region.

17. The video decoding method of claim 10, wherein the variation information comprises variation information representing a scale variation between the region in the current image and the reference region, which is generated based on a coordinate value in a scale space representing scale information of the region in the current image and a coordinate value in a scale space representing scale information of the reference region in the reference image which corresponds to the region in the current image.

18. A video decoding apparatus comprising:
 at least one processor, configured to obtain encoded information of a current image, variation information, and residual information about the current image from a bitstream; and
 a decoder configured to:
  determine a reference region in a reference image based on the obtained encoded information,
  predict the current image based on the obtained variation information, and
  restore the current image from the predicted current image by performing inverse-quantization and inverse-transformation on the obtained residual information,
 wherein the variation information comprises at least one of difference component in scale and difference component in angle between a region in the current image and the reference region.

19. A non-transitory computer-readable recording medium that stores a program that performs the video decoding method of claim 10 when executed by a computer.

20. The video encoding method of claim 1, wherein the generated variation information comprises differences in the scale and the angle between the region in the current image and the reference region, which are calculated by determining corresponding feature points in the region in the current image and the reference region.

* * * * *